Sept. 20, 1971　　　　　J. B. STRIBLING　　　　　3,605,656
FURNACES

Filed May 22, 1969　　　　　　　　　　　　　　　　5 Sheets-Sheet 1

INVENTOR
JOHN B. STRIBLING

By　　　　　
　　　AGENT

Sept. 20, 1971  J. B. STRIBLING  3,605,656
FURNACES

Filed May 22, 1969  5 Sheets-Sheet 2

INVENTOR
JOHN B. STRIBLING
BY
AGENT

United States Patent Office 3,605,656
Patented Sept. 20, 1971

3,605,656
FURNACES
John Brian Stribling, Sutton Coldfield, England, assignor to Calval Developments Limited, Wednesbury, England
Filed May 22, 1969, Ser. No. 826,863
Claims priority, application Great Britain, June 8, 1968, 27,361/68
Int. Cl. F23g 5/00
U.S. Cl. 110—13                                                    10 Claims

ABSTRACT OF THE DISCLOSURE

The invention provides a fully automatic furnace for burning waste materials, having a rotatable hearth, auxiliary burners and combustion air inlets directed tangentially on to the hearth, and a plough for deflecting waste material deposited on to the hearth from one to another of the concentric paths so that the residue after combustion is directed into an axial ash chute.

---

This invention relates to furnaces for burning waste products, for example scrap rubber such as useless vehicle tyre carcases, difficulty combustible towns refuse such as plastic containers, and particularly partially compressed sludge cake from sewage processes.

The object of the invention is to provide a furnace of this kind which is capable of quick, efficient and clean combustion with a minimum of attention even when burning diverse materials.

In accordance with the invention considered broadly a furnace comprises at least one fuel burner, at least one combustion air inlet port, an inlet for waste material to be burned and an outlet flue, all located above a hearth on which the material is burnt.

Preferably means are provided for sensing conditions in the furnace and regulating at least fuel and air supply in accordance with said conditions so as to maintain complete combustion.

Preferably also feed of water material and the residence time in the furnace is regulated in accordance with furnace conditions.

In a preferred construction, the furnace has a rotating annular hearth with an axial and possibly water cooled and/or sealed, ash pit or chute, and the waste material is fed to the periphery of the hearth and moved inwards by a water cooled plough or series of ploughs to be pushed out into the pit or chute at the completion of part of a revolution or of one revolution or of several revolutions, according to the nature of the material, the location of the plough(s) and the required residence time. In this event hearth speed and possibly plough position may be controlled also by furnace conditions. The feed material may be batched and measured as to weight and/or volume prior to admittance into the furnace, and the permissible fuel volume controlled in accordance therewith. Preferably fuel (waste material) is fed by a series of conveyors which can be controlled individually.

All of the controls and regulations may be accomplished via conventional electronic circuitry and logic switching, or via fluid logic switching for example.

Figure 1:
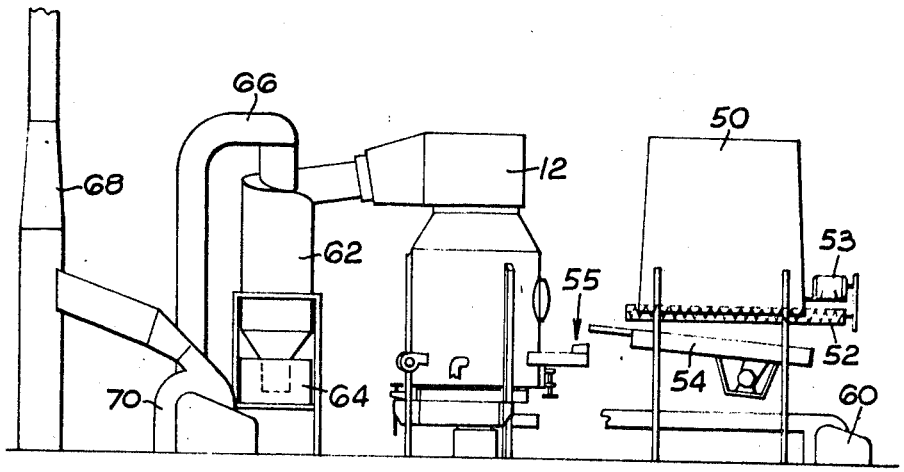
Figure 3:
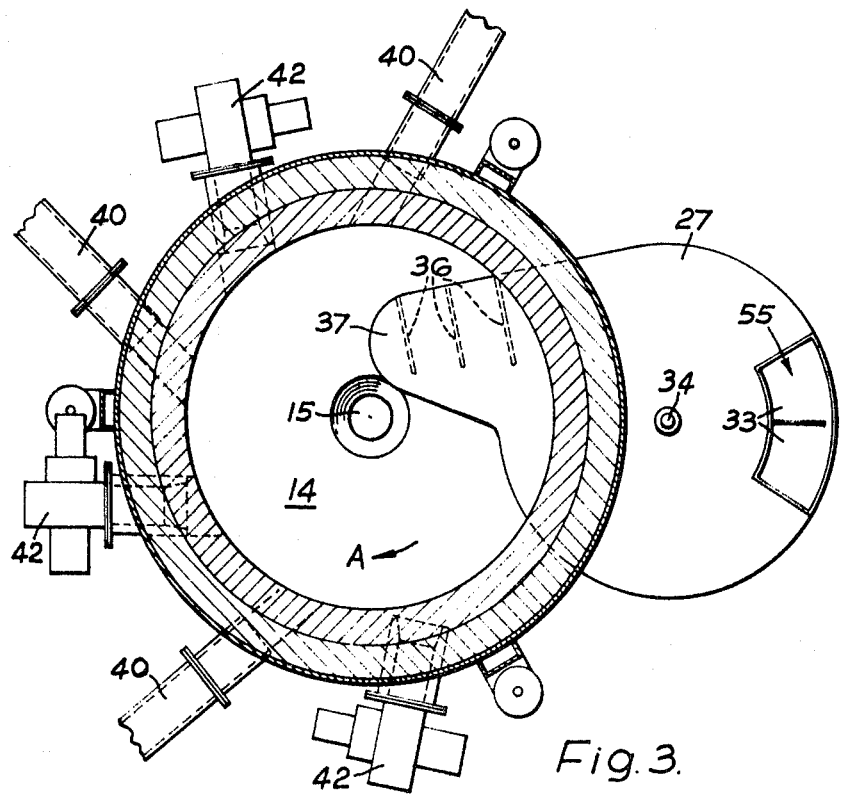
Figure 2:
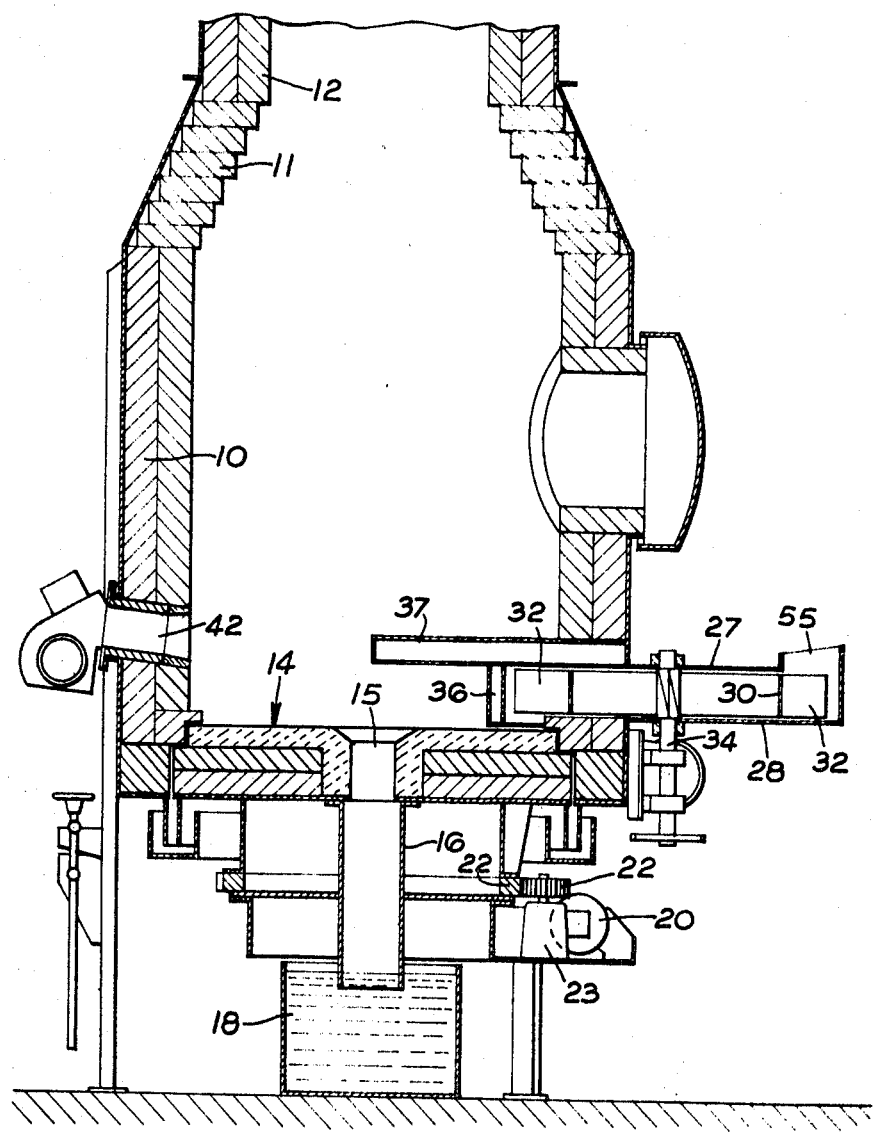
Figure 4A:
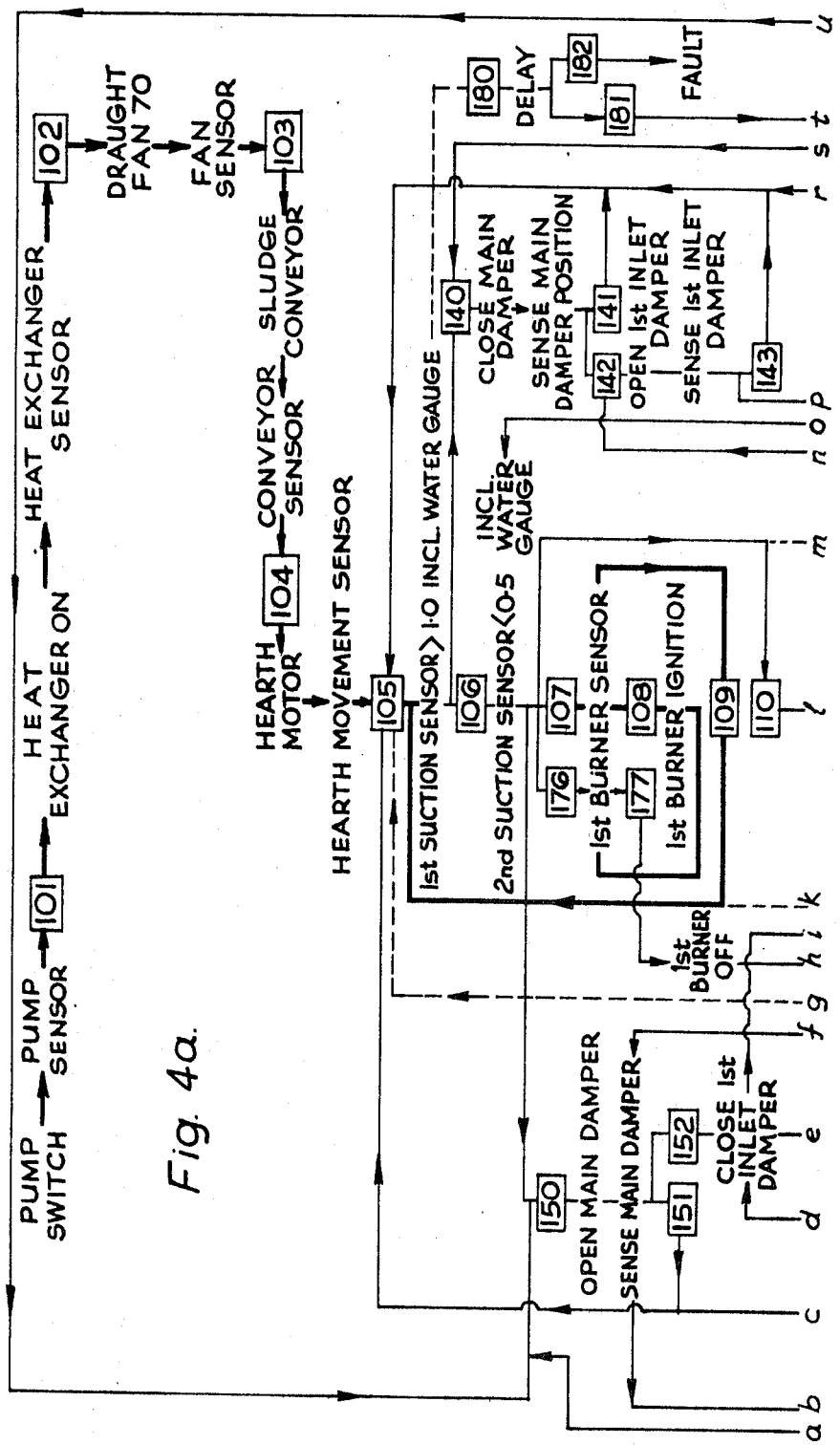
Figure 4B:
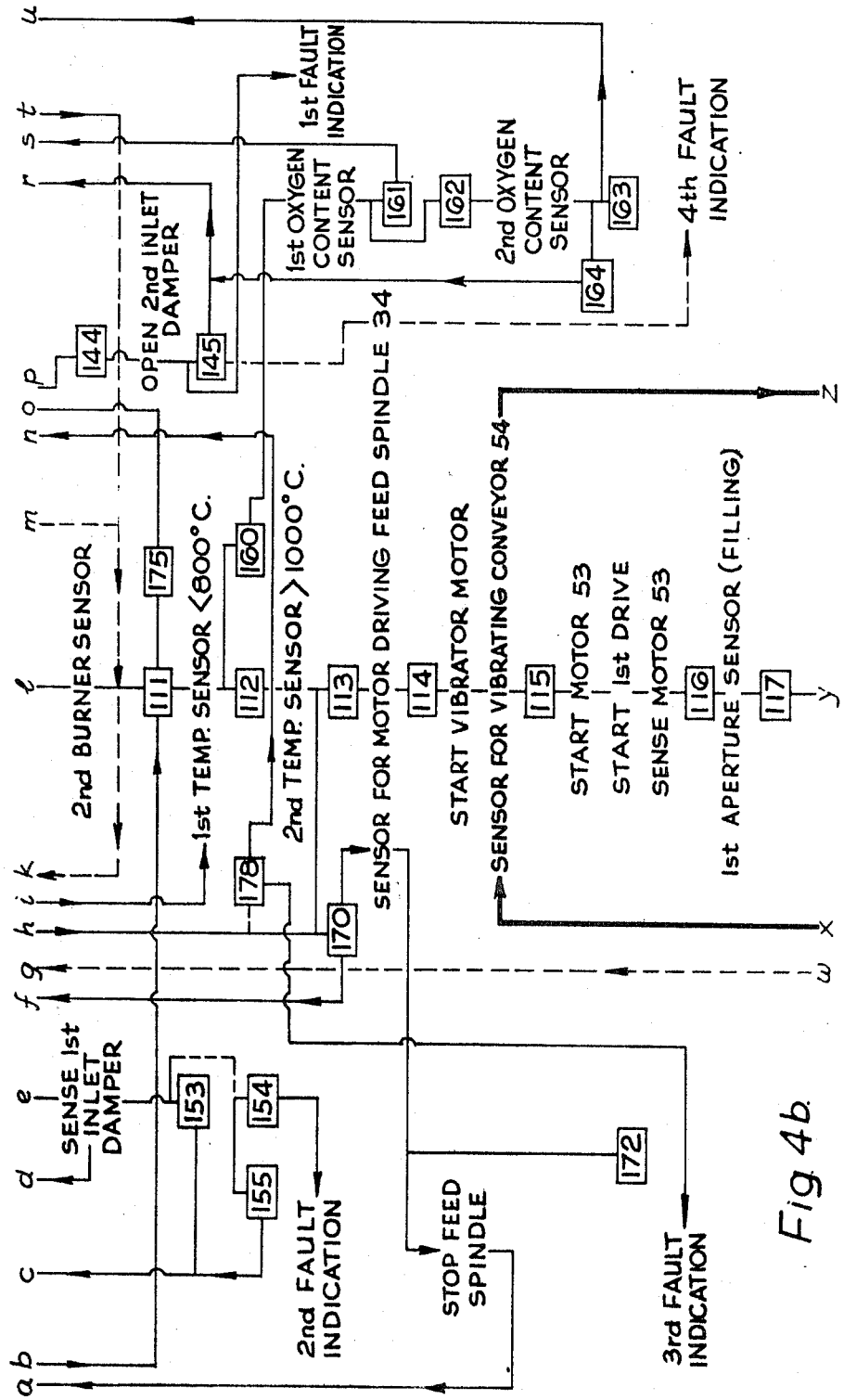
Figure 4C:
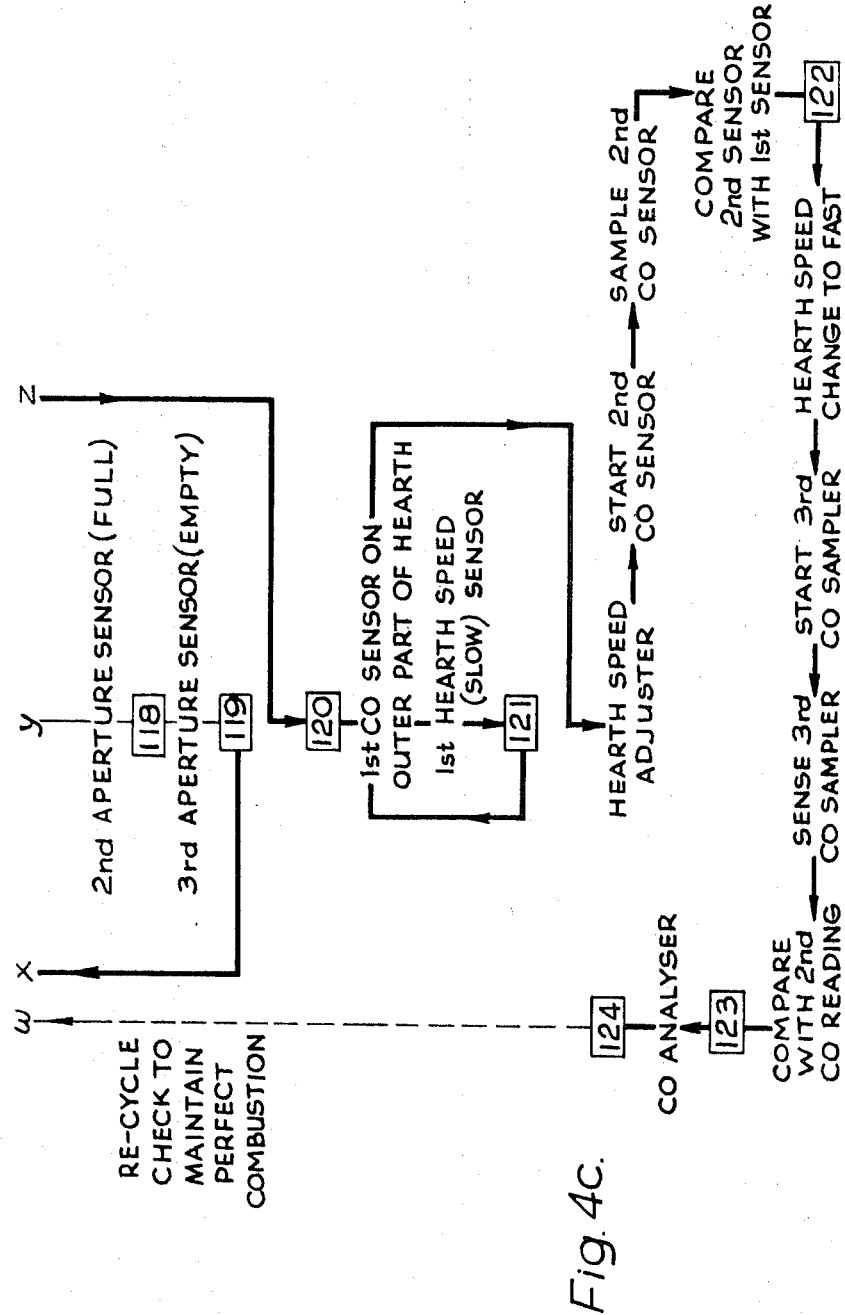

One embodiment of the invention is now more particularly described with reference to the accompanying drawings, wherein:

FIG. 1 is a diagrammatic elevation of an apparatus;
FIG. 2 is a fragmentary sectional elevation of a furnace forming part of said apparatus;
FIG. 3 is a sectional plan view of the furnace; and
FIGS. 4a, 4b and 4c together provide a schematic diagram showing the control arrangements preferred.

Referring now to the drawings and particularly FIG. 2 thereof, the furnace comprises a cylindrical vertically disposed chamber 10 terminating at its upper end in a conical portion 11 leading to a smoke flue 12. The hearth 14 is annular and has a central orifice 15 opening to chute 16 extending into a water seal 18. The hearth is rotatable by motor 20 via ring gear 22 and gear box 23. A sludge conveyor (not shown) carries solid products out of the seal.

The furnace wall is slotted immediately above hearth level and an inlet feed structure is assembled in the slot. This structure comprises parallel top and bottom plates 27, 28 housing a rotatable sleeve 30 provided with radial vanes 32 forming compartments 33 therebetween. The rotatable parts turn with spindle 34 via a motor (not shown). The bottom plate 28 terminates at the furnace wall so that the compartments located (at any time) in the furnace interior are bottomless.

Adjacent to the feed structure is a water cooled plough arrangement 36 suspended from a water-cooled bearer 37. The ploughs extend secant-wise of the hearth. The ploughs in this embodiment, are fixed in position. The arrangement is such as to provide three concentric paths for waste material on the hearth. The material is deposited on the outer path from the bottomless compartment, is pushed to the second or middle path by the outer plough share, and the second share in turn pushes the material from the second path to the inner path, and the third or inner share pushes material from the inner path to the ash chute: alternatively only the outer share may be used and the material on the middle path may itself displace material to the inner path, and so on.

Tangential combustion air inlets 40 and burners 42 are provided around the hearth, each with associated blower motors, fuel feed arrangements and the like. The direction of rotation of the hearth is preferably that of arrow A, FIG. 3.

Referring now to FIG. 1 a waste material feed storage hopper 50 is provided with a series of Archimedian screws 52 driven by motor 53 to discharge material to a transverse conveyor (not shown) delivering to a vibratory feed conveyor 54 and the latter terminates over a surge hopper (not shown) delivering to aperture 55 in the top plate. The inlets 40 are fed from blower 60.

Smoke flue 12 is connected to a cooler and grit arrestor 62 to deliver ash into a water sealed tank 64, and the outlet 66 is connected to stack 68. An induced draught fan 70 is connected to pull gases through the system.

Assuming the furnace to be empty, it is first pre-heated by means of the fuel burners 42 which play tangentially above the furnace hearth. Waste material is then fed into the aperture 55, and delivered into the furnace by rotation of spindle 34, the charge dropping to the hearth as it passes over the end edge of the bottom plate 28.

The charge is carried around the furnace by the rotating hearth, undergoes combustion and then encounters the ploughs which deflect it or the residue (if any) (eventually) into the chute and to the waste tank 18. The residue from basically organic products may be small due to the formation of carbon dioxide and other gases.

The combustion products spiral upwardly of the combustion chamber due to the tangential firing burners (see FIG. 1) and combustion air inlets (and aided by the induced fan pressure) and exit through the apparatus.

Not shown in FIG. 2 is a heat exchanger, designed to utilise the heat of the gases, for example for water heating.

For economically efficient combustion of refuse which is variable in combustibility automatic control over the quantity of fuel and air, and possibly also the residence time in the combustion chamber i.e. the rate of feed of fresh material and the speed of rotation of the hearth, is desirable. In accordance with a feature of the invention the furnace is controlled so as to achieve desired combustion wholly automatically. This is achieved by using sensors connected to a logic circuit, and making adjustments to controls accordingly.

This can be effected by means of a series of logic gates, which are either electronic in operation (being solid state switching for example) or fluid in operation using compressed air, although the electronic method is to be preferred in view of the greater rapidity of operation. Each gate or switch will give one of two alternative reactions depending upon the nature of the input signal supplied, that is in the present case depending upon whether the comparison of the measurement made with the optimum measurement required is greater or lesser in degree, in the simplest case it will read "yes" or "no" according to whether a part is moving, or in a particular condition. These alternative output signals are then used by means of transducers to operate the normal furnace controls, such as oil burner ignition, furnace draught, or fuel admission. Because of the great rapidity of operation of these switch gate units a great number can be used to give automatically an electrical impulse to the furnace controls depending upon the combination of output signals from the various switch units, within a fraction of a second of the initiation of the signals by the furnace instruments. In the present example the signals from the control instruments will be such that once the furnace has been started empty, and heating of the empty furnace commences, automatic correction is continually made by means of Iris and Butterfly dampers on the induced draught 70 and the positive pressure 60 fans, and by means of modulation of the oil or gas auxiliary fuel burners, according to signals obtained from the gas analysis, temperature, and pressure, and the position and movement measuring instruments, until the furnace reaches its preset condition of correct temperature and pressure, when suitable signals will initiate the commencement of feed of the main fuel (i.e. the waste material). The presence and quantity of the batch of material to be burnt (or alternatively its weight or volume) likewise initiate signals to the logic switching system to modulate the furnace controls and in turn the furnace condition would determine the time of subsequent charge of the next fuel batch.

The first operation is to start the pump (not shown on FIGS. 1–3) which directs water through the heat exchangers (also not shown) for utilisation of the heat of combustion. This connects a first sensor to read whether water is flowing. If "yes" gate 102 is connected to start the induced draught fan 70, FIG. 1, and if a further sensor reads that the fan is operating, "yes" gate 103 starts a conveyor (not shown) to remove sludge from the water pit below seal 18. Conveyor movement is sensed and via gate 104 hearth motor 20 is started. Hearth movement is sensed and if present, gate 105 connects a sensor for reading pressure drop, or suction in the smoke flue, and if not greater than 1 inch water gauge, "no" gate 106 reads.

A second suction sensor then reads if the pressure drop exceeds half inch water gauge, and if not, gate 107 connects a sensor reading the lit condition of a first of the fuel burners 42. If not lit, gate 108 connects a burner circuit to deliver fuel and ignite the fuel, and/or the sensor reads the lit burner. If on, gate 109 reads the first suction sensor or a duplicate of the same, and providing suction is less than 1 inch water gauge, "no" gate 102 reads the second suction sensor again. If pressure drop is less than half inch water gauge, "no" gate 110 reads the second of the burners, and a similar sequence is followed as with the first burner; these steps are repeated with the third burner. The sensors and gates are omitted from the diagram, FIG. 4. Satisfactory progression through the logic circuit, indicating that draught conditions are correct and all burners lit properly, leads to "yes" gate 111.

A first temperature sensor then reads if temperature is above 800° C. and if so, gate 112 connects a second temperature sensor which reads if temperature exceeds 1000° C. If not, gate 113 connects a sensor which reads whether the motor (not shown) driving the spindle 34 and feed compartments 32 is running. If so, gate 114 connects a circuit to start the vibrator motor for conveyor 54, which is sensed, and if running, gate 115 is connected. This starts the screw conveyor motor 53, starts a first timer, and senses the motor. If running, gate 116 connects a first sensor above aperture 55 i.e. in the surge hopper to determine if material is flowing into the same. If so, gate 117 is connected and a second aperture or hopper sensor is read to determine if the aperture (or hopper) is full. If not, gate 118 reads a third sensor to determine if empty, and "no" gate 119 may be connected.

Gate 119 reads the vibrator sensor and if running (thus checking feed supply) operates gate 120. This starts a first carbon-monoxide (CO) sampling sensor, located close to hearth level, and over the outer of the three concentric paths. It also operates a hearth speed sensitive sensor, and if the speed is slow "yes" gate 121 is connected.

Following this, the first CO sensor is read, and hearth speed is varied in inverse proportions to CO content, i.e. rasing the speed if CO is low and vice versa.

A second CO sensor, effective for the middle path of material on the hearth is now started, and sampled, and the reading from the middle path is compared with that of the first (outer) path. "Yes" gate 122 is read if the second CO reading is lower than that of the first, i.e. if the middle path CO content is lower than the outer path content.

"Yes" gate 122 indicates speed change of the hearth to the fastest speed starts the third CO sampler on the inner path of the hearth, reads the same, and compares the reading with that of the second sensor. If the reading of the third sensor is the lower, "yes" gate 123 connects CO content analyser and if lower than 3%, "yes" gate 124 reads, indicating satisfactory completion of combustion. Nevertheless, "yes" gate 124 is connected to gate 105 for continuous control over combustion conditions and the logic circuit cycles over gates 105–124 continuously whilst combustion remains at the required predetermined conditions.

Assuming no actual fault, perfect combustion will only be attained by adjustment of the variables including induced fan draught applied via fan 70, by a main damper, control over combustion air supplied by (possibly individual) control of the combustion air supplies via 40 by individual dampers, and other factors as will be apparent from the following description.

Assuming first that the first suction sensor reads a pressure drop which is too high, i.e. exceeds 1 inch water gauge, "yes" gate 140 will operate instead of "no" gate 106. This initiates closing of the main damper, and sensing of its condition: if not fully closed, i.e. because the incremental movement has not taken to that state, gate 105 is reconnected via "no" gate 141 to repeat the sensing of suction, and possibly a further incremental damper closing movement and so on. If or when the suction sensor continues to read in excess of 1 inch pressure drop, but the main damper is fully closed, "yes" gate 142 causes a first inlet 40 damper to open, to increase combustion air supply and its position is sensed: if not fully open, "no" gate 143 reconnects gate 105 for re-cycling of this sequence. If or when "yes" gate 144 operates (because further opening of this damper has not reduced suction below 1 inch so that gate 106 is operated) the same sequences are followed (but not shown) with the second and third inlets 40 dampers in turn: finally in this sequence, "no" gate 145 reconnects gate 105, for a repeat cycle, or "no" gate 146 gives a first fault indication, namely that pressure drop is too high, but all dampers are in extreme positions.

Similarly, if the second suction sensor reads a pressure drop which is too low, "yes" gate 150 operates to open the main damper, sense its position, and if not fully open, recycle via "no" gate 151 to gate 105. If fully open, "yes" gate 152 indicates closing of the first inlet 40 damper, and sensing of the same. If not fully closed, "no" gate 153 reconnects gate 105. If fully closed, the system works through the second and third inlet dampers in the same way terminating at "yes" gate 154 for second fault indication, or "no" gate 155 reconnected to gate 105.

The suction sensor readings taken between gates 109 and 111 are similar cycled back if the alternative gates are operated. Thus if, after burner ignition, pressure is too low, exceeding 1 inch water gauge drop, gate 140 is connected for main damper movement and its sub-cycle. If pressure is too high, gate 150 is connected for the same (but opposite) movement and sub-cycle of operations, by the described routes.

The first temperature sensor is connected via a "yes" gate 160 (if temperature is too low) to an oxygen content sensor, and if below 10% "yes" gate 161 causes gate 140 to be operated, and again the same cycle as described is followed. If "no" gate 162 operates, a second $O_2$ content sensor reads if above 8%, and "yes" gate 162 connects gate 150 for main damper opening, or "no" gate 164 connects gate 105.

If the temperature is too high, and gate 170 operates as the alternative to gate 113, the same feed spindle sensor is read, and if running, the feeder is stopped and the main damper opened, i.e. gate 150 is reconnected. The circuit may recycle to gate 113, but operate "no" gate 172, and go through a different sub-circuit of the logic system including sensing of the main damper, and if not fully open, gate 111 is connected.

If the damper (main) is fully open, gate 175 allows the second suction sensor to be re-read, if less than half inch gauge, the first burner is sensed, via gate 176, and if on, gate 177 shuts off the first burner and reconnects to gate 170. If the fault is not corrected after recycling, i.e. if gate 170 is connected again instead of gate 113, similar circuits of the system (not shown) shut off the second and if necessary the third burners. Continued recycling to gate 172 after all burners are off actuates gate 142 which connects the first inlet damper sensor (because temperature remains too high even without burning fuel, and the combustion air must be increased to reduce the combustion rate) and cycles via opening of the damper(s) to the first temperature sensor.

Recycling to 178 after the first damper is closed causes the second and third dampers respectively to be similarly acted upon and either the system cycles past gate 113 to gate 114 and the later ones in the perfect combustion sequence, or a third fault indicator is actuated from gate 179.

Similarly should the suction sensor read from gate 175 be at the wrong level, the first suction sensor is re-read and the inlet damper opened (none of which connections are shown as they follow the described pattern which will be understood by those in the art) leading possibly to full opening of all inlets and connection, or to a fourth fault indicator. If suction is correct, then the burner shut-off sub-circuits operate as before described, but terminating at gate 180, which operates a three minute delay, re-reads the second temperature sensor, and actuates gate 181 or 182, to indicate a fault or, if temperature has then dropped, reconnects gate 111.

Fault indicators are provided (not shown) for fan working, and all other stages: each stage of the complete system has two gates, i.e. a "yes" and a "no" gate, one of which leads on to the next stage (or reconnects to an earlier stage, possibly via control modification), and where an alternative is not illustrated, it is a fault indicator.

Further, the foregoing description refers only to slow and fastest hearth speeds but in changing from fast to slow, a sub-circuit may cycle through intermediate speed, only going on to slow if the incipient fault is not corrected. Further, the described pressures, temperatures, CO and $O_2$ levels may be varied to suit requirements especially in the nature of the burner fuel and waste material being burnt. Moreover, the CO may be sensed at the inner zone, when 3% may be suitable, or in the middle zone of the hearth annulus, when 3–6% range is likely, or in the outer zone when 6–10% range is a suitable level. Many other modifications will be readily apparent: in particular, instead of controlling hearth speed in stages, the hearth could be set for single revolutions, or multiples of the same, so that rotation continues whilst combustion conditions are good, but not otherwise.

I claim:

1. In a furnace for incinerating waste, the combination of a combustion chamber, an annular hearth rotatable about a vertical axis in said combustion chamber and constituting the bottom thereof, means for rotating said hearth, said hearth being provided at the center thereof with a downwardly extending ash outlet, said chamber being provided at one side thereof above said hearth with an inlet opening through which waste material may be deposited on the hearth near the outer periphery of the latter, at least one fuel burner firing into said chamber above the hearth, and deflector means fixedly mounted in said chamber above the hearth and in advance of said inlet opening in relation to the direction of rotation of the hearth for deflecting waste material from the outer peripheral portion of the hearth toward said ash outlet at the center of the hearth after such material has been subjected to the action of said burner for at least one revolution of the hearth.

2. The device as defined in claim 1 together with means for loading waste material into said chamber through said inlet opening, said loading means comprising a rotary member having a plurality of waste material receiving compartments, a portion of said rotary member being disposed exteriorly of said chamber so that waste material may be loaded into said compartments, another portion of said member passing through said inlet opening into said chamber so that material in said compartments may be deposited on the outer peripheral portion of said hearth, and means for rotating said rotary member.

3. The device as defined in claim 1 together with at least one combustion air inlet port communicating with said chamber, said air inlet port and said fuel burner being oriented so as to direct air and flame into the chamber tangentially of said hearth in a direction opposite to that of rotation of the hearth.

4. The device as defined in claim 1 together with a logic system for automatically controlling combustion by sensing pressure in said chamber and regulating a damper in accordance therewith.

5. The device as defined in claim 1 together with a logic system for automatically controlling combustion by sensing temperature in said chamber and regulating said fuel burner in accordance therewith.

6. The device as defined in claim 1 together with a logic system for automatically controlling combustion by sensing speed of rotation of said hearth and regulating the same in accordance with combustion conditions.

7. The device as defined in claim 2 together with a logic system for automatically controlling combustion by sensing presence of material in said compartments and regulating said fuel burner in accordance therewith.

8. The device as defined in claim 1 together with an induced draft fan, a damper and a logic circuit for sensing pressure in said chamber and regulating said damper in accordance therewith.

9. The device as defined in claim 1 together with a CO sampler and a logic circuit for regulating fuel and air supplies in accordance therewith.

10. The device as defined in claim 1 together with a temperature sensor and a logic circuit for regulating fuel and/or air supplies in accordance therewith.

References Cited

UNITED STATES PATENTS

| | | | |
|---|---|---|---|
| 1,582,952 | 5/1926 | Wedge | 110—36 |
| 2,171,538 | 9/1939 | Black et al. | 110—36X |
| 2,183,386 | 12/1939 | Yeager | 110—36 |
| 2,948,237 | 8/1960 | Toepel | 110—36X |
| 2,939,409 | 6/1960 | Shaughnessy | 110—13 |
| 2,592,491 | 4/1952 | Toepel | 110—8 |
| 2,138,120 | 11/1938 | Raisch | 110—13X |

KENNETH W. SPRAGUE, Primary Examiner

U.S. Cl. X.R.

110—36